United States Patent [19]

Mugura et al.

[11] Patent Number: 5,977,975
[45] Date of Patent: Nov. 2, 1999

[54] ARRAY OF DISPLAYED GRAPHIC IMAGES FOR ENABLING SELECTION OF A SELECTABLE GRAPHIC IMAGE

[75] Inventors: Kazuto Mugura, San Francisco, Calif.; Eduardo Sciammarella, New York, N.Y.; Scott Kravitz, San Francisco, Calif.

[73] Assignees: Sony Corporation, Japan; Sony Electronics, N.J.

[21] Appl. No.: 09/006,472

[22] Filed: Jan. 13, 1998

[51] Int. Cl.[6] .............................. H04M 11/00; G06F 3/14
[52] U.S. Cl. ........................ 345/352; 345/341; 379/354; 379/355
[58] Field of Search ................................... 345/341, 123, 345/352, 339, 156; 379/457, 170, 433, 428, 355, 354

[56] References Cited

U.S. PATENT DOCUMENTS

| 5,095,503 | 3/1992 | Kowalski | 379/354 |
| 5,233,333 | 8/1993 | Borsuk | 345/127 |
| 5,303,388 | 4/1994 | Kreitman et al. | 345/348 |
| 5,436,954 | 7/1995 | Nishiyama et al. | 455/566 |
| 5,710,810 | 1/1998 | Tiilikainen | 379/355 |
| 5,737,394 | 4/1998 | Anderson et al. | 379/88.11 |

*Primary Examiner*—Raymond J. Bayerl
*Assistant Examiner*—Cuong T. Thai
*Attorney, Agent, or Firm*—Fulwider Patton Lee & Utecht, LLP

[57] ABSTRACT

An instrument includes a display screen which includes a bitmap graphical user interface including an on-screen menu, and a control element which enables movement of the on-screen menu corresponding to movement of the control element, enables the user to manipulate and select graphic images for executing selected instrument functions. The instrument is adapted to enable display of an array of graphic images on the display screen, such that the user is able to view the array and focus on and select a selectable graphic image from the array.

10 Claims, 2 Drawing Sheets

ARRAY OF DISPLAYED GRAPHIC IMAGES FOR ENABLING SELECTION OF A SELECTABLE GRAPHIC IMAGE

BACKGROUND OF THE INVENTION

The present invention relates generally to an interface for a display screen and, more particularly, to a graphical user interface which, with a control device, enables manipulation of graphic images on a display screen.

In an instrument which includes a display screen, an on-screen menu, and a control device, a user may interact with the on-screen menu by viewing the on-screen menu, deciding to select a menu item, and manipulating the control device to generate menu movement and to enable entry of the menu selection.

The instrument may comprise a hand-held wireless telephone which includes an on-screen menu displayed in a text text-based interface on a small liquid-crystal display screen, and a jog dial control device for scrolling through the menu and for entry of a menu selection and execution of an instrument function thereby.

The small liquid crystal display screen may enable viewing of a small number of lines of text, typically two lines. The menu may include a phone book feature in which names and phone numbers may be entered, for enabling browsing and selection of an entry whereupon the phone number selected is dialed. The instrument may also include other functions, such as pager reception, two-way pager sending, or short message sending such as e-mail. However, such an instrument may require frequent selection of menu entries and instrument functions by the user through the small text-based display screen which displays a very limited number of entries. The user may choose a single item from the items displayed, and may only need to focus on the single item to be selected, but the multiple items on display increase the difficulty in selecting the single item.

Therefore, there has been a need existing for a system which enables the user of an instrument to view and manipulate an intuitive interface in the display, and to view movement in the interface which corresponds to movement of the control device. The present invention fulfills these needs.

SUMMARY OF THE INVENTION

Briefly, and in general terms, the present invention provides an on-screen menu in an interactive graphical user interface, which provides for enabling manipulation of graphic images in a display screen.

The system enables display of an array of graphic images out of a plurality of graphic images on a compact display screen mounted in an instrument adapted to be held by the user in one hand, to enable the user to view, focus on and select a selectable image from the array of graphic images in the display screen. It further enables the user to locate another graphic image in the array of graphic images to be moved into position as the selectable graphic image, wherein the plurality of graphic images are each movable into and out of position as the selectable graphic image. It includes a compact display screen mounted in the hand-held instrument. It further includes means for presenting the array of multiple graphic images in the display screen, each graphic image being different from the other, which presenting means comprise a graphical user interface. It also includes means for enabling a graphic image to be a selectable graphic image. The system also includes means for enabling the user to view the array of multiple graphic images and differentiate between the selectable and other graphic images, other than by the differences between graphic images. It further includes means for enabling movement of the graphic images into and out of position as the selectable graphic image, and for enabling selection of the selectable graphic image.

One aspect of the present invention is that a system enables the user to view and manipulate graphic images in an on-screen menu in an intuitive graphical user interface in a display screen.

Another aspect of the present invention is that a system in a hand-held instrument enables the user to view, manipulate, focus on and select a selectable graphic image in an array of graphic images in an on-screen menu, in a graphical user interface on a compact display screen in the instrument.

Other features and advantages of the invention will become apparent from following detailed description taken in conjunction with the accompanying drawings, which illustrate, by way of example, the features of the invention.

DETAILED DESCRIPTION OF THE PREFERRED EMBODIMENTS

Figure 1:
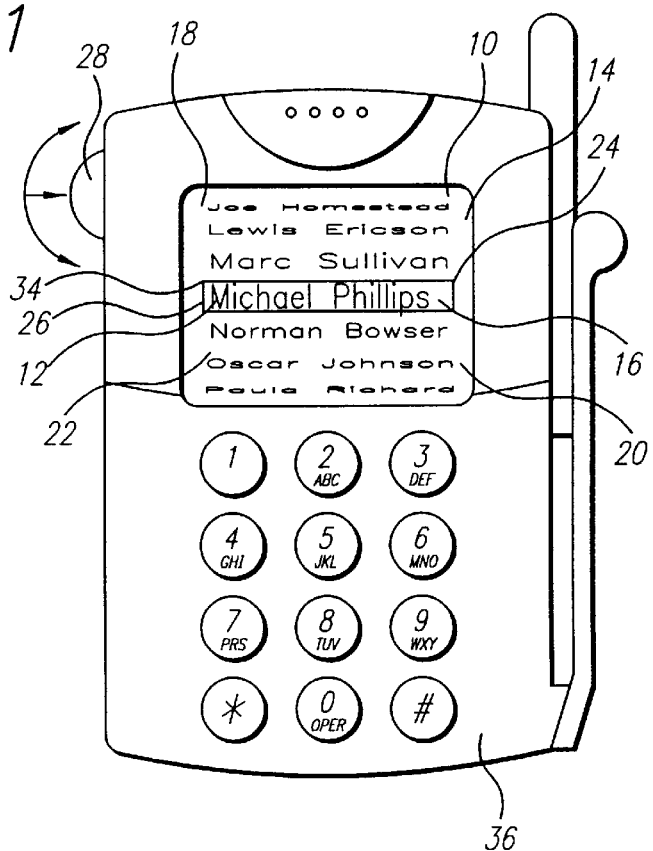
FIG. 1 is an elevational view of a display in an instrument which includes an on-screen menu in accordance with the present invention.

Referring now to the drawings, there are shown preferred embodiments of a system 10 for enabling manipulation of a plurality of graphic images 12 on a display screen 14.

Figure 2:
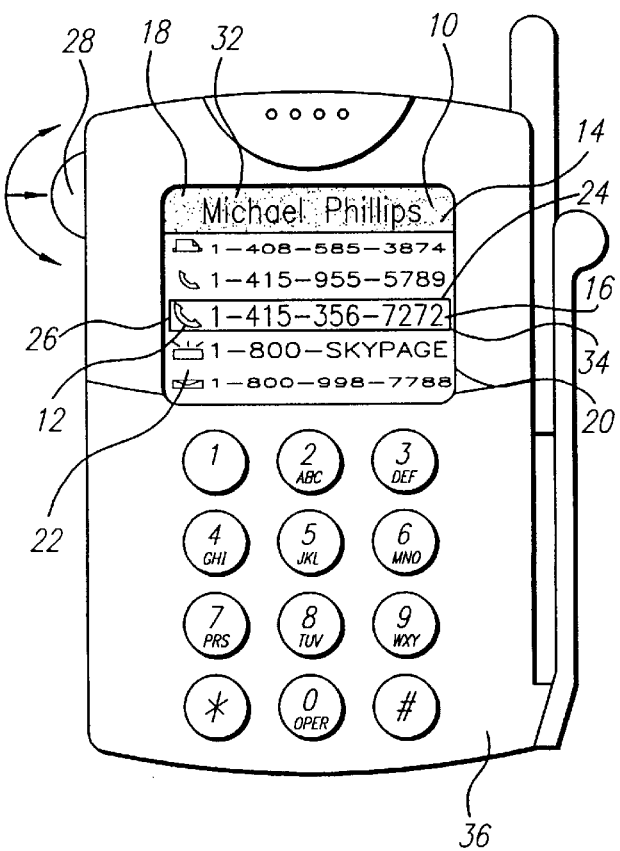
FIG. 2 is an elevational view of a further display in an instrument which includes an on-screen menu in accordance with the present invention.
Figure 3:
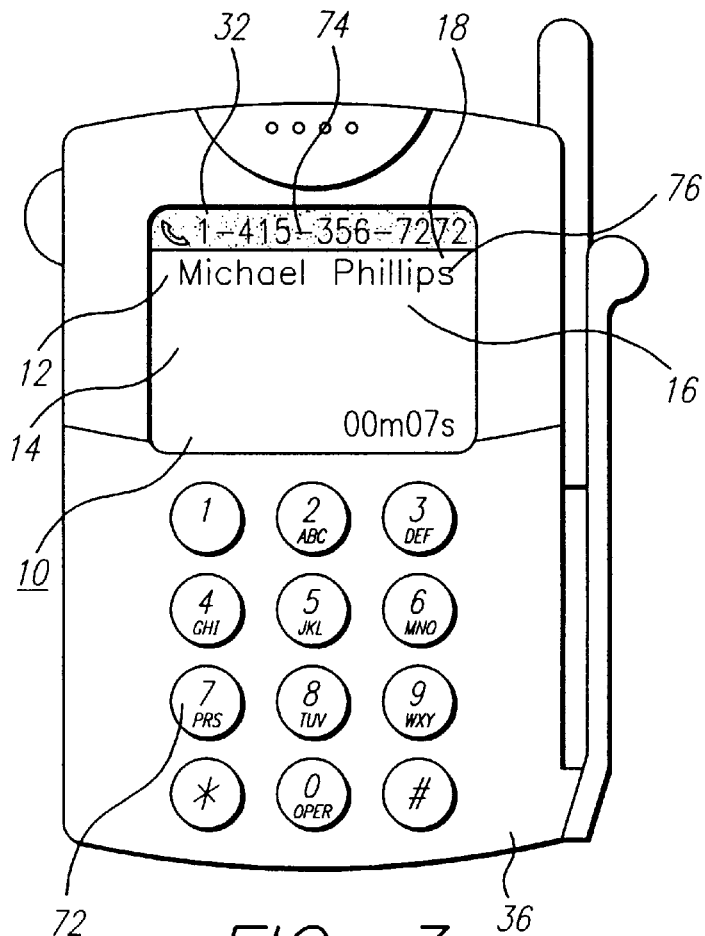
FIG. 3 is an elevational view of a still further display in an instrument which includes an on-screen menu in accordance with the present invention.
Figure 4:
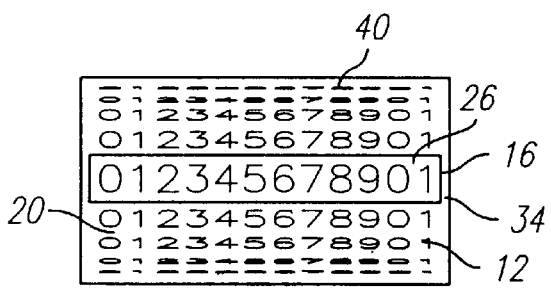
FIG. 4 is an elevational view of an on-screen menu in a display screen in accordance with the present invention.
Figure 5:
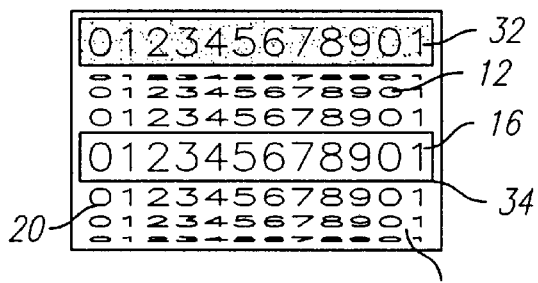
FIG. 5 is an elevational view of another on-screen in a display screen in accordance with the present invention.

In a preferred embodiment as shown in FIGS. 1–5, system 10 is adapted to enable a user to view array 20 of multiple graphic images 12, out of the plurality of graphic images 12, on display screen 14 in instrument 36. It enables the user to view, focus on, and select selectable graphic image 16 from array 20, and to view the multiple graphic images 12 in array 20 other than selectable graphic image 16, to locate another graphic image 12 which may be desired to be moved into position 26 as selectable graphic image 16. Display screen 16 may be a compact display screen which may comprise a bitmap screen for presenting graphical user interface 18, and instrument 36 may be a hand-held instrument which may comprise a wireless telephone.

The font sizes of multiple graphic images 12 other than selectable graphic image 16 may decrease with increasing distance from selectable graphic image 16, enabling the user to view array 20 of graphic images 12 in display screen 14. The font size may comprise the height of the fonts of graphic images 12 other than selectable graphic image 16, which font size may decrease with increasing distance from selectable graphic image 16.

The multiple graphic images 12 in array 20 on display screen 14 may comprise at least three graphic images 12, and preferably comprise seven graphic images 12.

In operation, for example, wireless telephone 36 may be activated, with multiple graphic images 12 displayed in display screen 14. The height of the fonts of multiple graphic images 12 may decrease with increasing distance from selectable graphic image 16, to enable at least three graphic images 12, and preferably seven graphic images 12, to be displayed in display screen 14, so as to enable the user to view, focus on, and select selectable graphic image 16 from array 20, and to locate another graphic image which may be desired to be moved into position 26 as selectable graphic image 16.

From the foregoing it will be appreciated that the system of the present invention provides advantages in enabling manipulation of a plurality of graphic images on a display screen. While particular forms of the invention have been illustrated and described, it will be apparent that various modifications can be made without departing from the spirit and scope of the invention. Accordingly, the invention is not to be limited, except as by the following claims.

We claim:

1. A system for enabling an array of multiple graphic images out of a plurality of graphic images to be displayed on a compact display screen mounted in an instrument adapted to be held by the user in one hand, to enable a user to view, focus on and select a selectable graphic image from the array of graphic images in the display screen, and to locate another graphic image in the array of graphic images to be moved into position as the selectable graphic image, wherein the plurality of graphic images are each movable into and out of a position as the selectable graphic image, and each of the plurality of graphic images represents an accessible function of the system, the system comprising:

a compact display screen mounted in an instrument adapted to be held by the user in one hand;

means for presenting the array of multiple graphic images in the display screen, wherein each graphic image is different from the other graphic images and the multiple graphic images are each movable into and out of a position as the selectable graphic image, comprising a graphical user interface;

means for enabling a graphic image to be a selectable graphic image, which graphic image is movable into the selectable position in the presenting means;

means for enabling the user to view the array of multiple graphic images in the display screen, and to differentiate between the graphic image positioned as the selectable graphic image and the graphic images other than the selectable graphic image in the display screen other than by the differences between the graphic images or the accessible functions represented by the graphic images; and means for enabling movement of the multiple graphic images into and out of the position as the selectable graphic image, and for enabling selection of the selectable graphic image in the display;

wherein each of the plurality of graphic images is comprised of a plurality of characters, and the plurality of characters in each of the plurality of graphic images are comprised of a font size, and the font size of the plurality of characters in a graphic image upon movement into position in the display screen as a selectable graphic image is greater than the font sizes of the plurality of characters in the plurality of graphic images other than the selectable graphic image, and the font size of the plurality of characters in each of the plurality of graphic images in the display screen other than the selectable graphic image increases upon movement into position closer to the selectable graphic image and decreases upon movement into position further from the selectable graphic image.

2. The system of claim 1, wherein the font size comprises the height of the font, and the differentiating means comprise the height of the fonts of the graphic images other than the selectable graphic image which decrease with increasing distance from the selectable graphic image.

3. The system of claim 1, wherein the multiple graphic images in the array displayed in the display screen comprise at least three graphic images.

4. The system of claim 3 wherein the multiple graphic images in the array displayed in the display screen comprises seven graphic images.

5. The system of claim 1, wherein the display screen comprises a bitmap screen.

6. A method of enabling an array of multiple graphic images out of a plurality of graphic images to be displayed on a compact display screen mounted in an instrument adapted to be held by the user in one hand, to enable a user to view, focus on and select a selectable graphic image from the array of graphic images in the display screen, and to locate another graphic image in the array of graphic images to be moved into position as the selectable graphic image, wherein the plurality of graphic images are each movable into and out of a position as the selectable graphic image, and each of the plurality of graphic images represents an accessible function of the system, in a system which comprises a compact display screen mounted in an instrument adapted to be held by the user in one hand, means for presenting the array of the multiple graphic images in the display screen, wherein each graphic image is different from the other graphic images and the multiple graphic images are each movable into and out of a position as the selectable graphic image, comprising a graphical user interface, means for enabling a graphic image to be a selectable graphic image, which graphic image is movable into the selectable position in the presenting means, means for enabling the user to view the array of multiple graphic images in the display screen, and to differentiate between the graphic image positioned as the selectable graphic image and the graphic images other than the selectable graphic image in the display screen other than by the differences between the graphic images or the accessible functions represented by the graphic images, and means for enabling movement of the multiple graphic images into and out of the position as the selectable graphic image, and for enabling selection of the selectable graphic image in the display, the method comprising:

activating the instrument:

presenting the array of graphic images in the display screen, comprising presenting the font size of the plurality of characters in a graphic image upon movement into position as a selectable graphic image as greater than the font sizes of the plurality of characters in the plurality of graphic images other than the selectable graphic image, and presenting the font size of the plurality of characters in each of the plurality of graphic images in the display screen other than the selectable graphic image as increased upon movement into position closer to the selectable graphic image and decreased upon movement rate position further from the selectable graphic image;

moving the movement enabling means to move a graphic image into and out of position as the selectable graphic image, wherein movement of a graphic image into position as the selectable graphic image enables the user to differentiate between the plurality of graphic images other than by the differences between the graphic images or the accessible functions represented by the graphic images and to select the selectable graphic image; and activating the movement enabling means to select the selectable graphic image in the display;

wherein each of the plurality of graphic images is comprised of a plurality of characters, and the plurality of characters in each of the plurality of graphic images are comprised of a font size, and the font size of the plurality of characters in a graphic image upon movement into position in the display screen as a selectable graphic image is greater than the font sizes of the plurality of characters in the plurality of graphic images other than the selectable graphic image, and the font size of the plurality of characters in each of the plurality of graphic images in the display screen other than the selectable graphic image increases upon movement into position closer to the selectable graphic image and decreases upon movement into position further from the selectable graphic image.

7. The method of claim 6, wherein the font size comprises the height of the font, and the differentiating means comprise the height of the fonts of the graphic images other than the selectable graphic image which decrease with increasing distance from the selectable graphic image, and the step of presenting the array comprises presenting the array of graphic images in the display screen such that the height of the fonts of the graphic images other than the selectable graphic image decrease with increasing distance from the selectable graphic image.

8. The method of claim 6, wherein the multiple graphic images in the array displayed in the display screen comprise at least three graphic images, and the step of presenting the array comprises presenting at least three graphic images in the display screen.

9. The method of claim 8, wherein the multiple graphic images in the array displayed in the display screen comprises seven graphic images, and the step of presenting the array comprises presenting the seven graphic images in the display screen.

10. The method of claim 6, wherein the display screen comprises a bitmap screen, and the step of presenting the array comprises presenting the array of graphic images in the bitmap screen.

* * * * *

UNITED STATES PATENT AND TRADEMARK OFFICE
CERTIFICATE OF CORRECTION

PATENT NO. : 5,977,975
DATED : Nov. 2, 1999
INVENTOR(S) : Kazuto Mugura, Eduardo Sciammarella, Scott Kravitz It is certified that error appears in the above-identified patent and that said Letters Patent is hereby corrected as shown below:

Title page, in the title, before "ARRAY", add --AN--.

Column 1, line 1, title, before "ARRAY", add --AN--.

Signed and Sealed this

Third Day of April, 2001

*Attest:*

NICHOLAS P. GODICI

*Attesting Officer*     *Acting Director of the United States Patent and Trademark Office*